Aug. 26, 1924.

H. BOYER 1,506,045

SPARROW TRAP

Filed April 18, 1922

Inventor
Henry Boyer
Attorney

Patented Aug. 26, 1924.

1,506,045

UNITED STATES PATENT OFFICE.

HENRY BOYER, OF MILFORD, ILLINOIS.

SPARROW TRAP.

Application filed April 18, 1922. Serial No. 554,706.

*To all whom it may concern:*

Be it known that HENRY BOYER, a citizen of the United States, residing at Milford, in the county of Iroquois and State of Illinois, has invented certain new and useful Improvements in Sparrow Traps, of which the following is a specification.

My invention relates particularly to a bird trap of wire fabric combined structure adapted to be held in adjusted position in the window of any building where annoyances are had by small birds, such as sparrows flying into a room through an open window.

One of the objects of my invention is to provide a bird trap that can be placed in position in any window, which will trap any bird that tries to enter the building, and at the same time allow fresh air to enter the building through the open window for the purpose of ventilation.

A further object of my invention is the provision of a substantially square fabric member, connected with a window engaging means for adjusting same in position, by means of a cylindrical passageway, which will allow the birds to enter the square fabric member.

A still further object of my invention is to provide means for preventing any bird entering the square fabric member from escaping out of same, back through the cylindrical member.

And a still further object of my invention is to provide a device of this character that is simple and inexpensive to manufacture, durable and efficient for the purpose intended and readily operated.

With the above and other objects in view the invention resides in the novel features of construction, combination and arrangement of parts to be hereinafter more particularly described, claimed and illustrated in the accompanying drawings, in which—

Referring to the drawings in detail, like references will be used to designate like parts in the different views.

Figure 1:
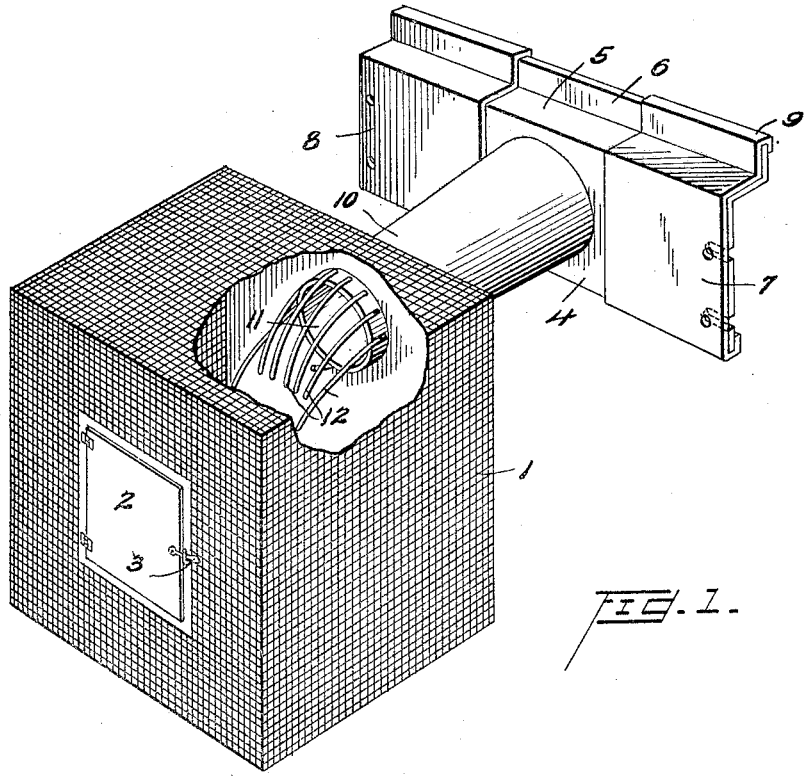
Figure 1 is a perspective view of my invention with a portion of the square fabric cage broken away to better illustrate the interior of same.
Figure 2:
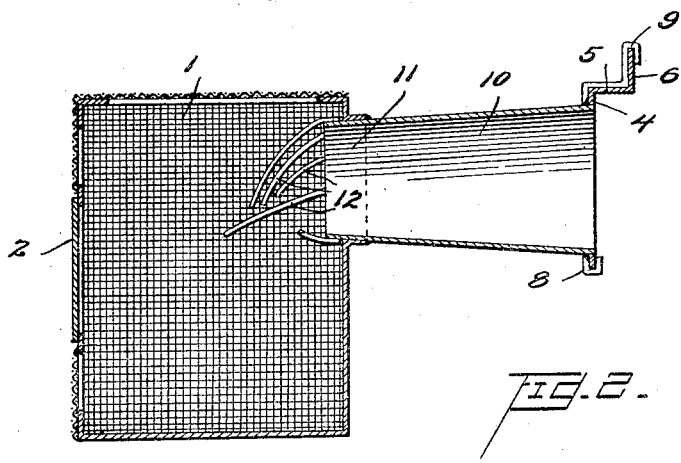
Figure 2 is a transverse vertical section of same.

The numeral 1 denotes a fabric cage substantially square in form, and provided with a hinged door 2 having a fastening device 3 of any suitable construction. The door 2 is provided for the purpose of entering the cage after the same has trapped a bird.

A window frame engaging plate 4 having a flange 5 bent at right angle to the plate 4, and a second flange 6 bent at right angle to the first mentioned flange. The plates 7 and 8 are of such formation as to conform to the shape of the plate 4 and the flanges 5 and 6 and are slidably mounted on opposite ends of the plate 4. The flanges of the plates 4, 7 and 8 provide a ledge 9, the purpose of which will be hereinafter described and explained.

Formed integral with the plate 4 at a point between the adjustable plates 7 and 8 is a cylindrical tube 10 having a reduced end 11, which extends within the interior of the square fabric case 1. A series of spring fingers 12 which act as a guard to prevent birds from leaving the cage through the cylindrical tube 10 are secured to the reduced end 11. The spring fingers being bent outwardly and downwardly over the opening in the reduced end.

From the foregoing it will be understood that in the operation of my invention, the plate 4 is placed crosswise of an open window and the sliding plates 7 and 8 are brought into engagement with the side of the window frame between the beading, not shown, in which the sash of the window slides up and down. After the trap has been securely placed in position, the sash of the window is lowered until same rests on the ledge 9, which will prevent birds from entering the building except through the cylindrical member 10, which as shown and described opens into the cage 1 and after the birds have passed into the cage 1 they are prevented from returning to the outside by the fingers or guards 12. As the cage is constructed of wire fabric, air is permitted to enter the room through the cylindrical member 10 which communicates with the atmosphere. The wire cage if constructed of sufficiently close woven wire fabric, the same would also prevent flies from entering the room of the dwelling in which the same was placed.

While I have shown and described the preferred embodiment of my invention, I realize that minor changes may be resorted to, without departing from the spirit and scope of the invention as claimed, therefore I do not wish to limit myself to the exact details of construction shown, nor the combination and arrangement of parts.

What I claim as new and desire to secure by Letters Patent is:—

A bird trap comprising a wire cage; a supporting means adapted to engage the frame of a window, a tubular member extended from the supporting means and communicating with the interior of the wire cage at one end and the opposite end open and communicating with the atmosphere; and a non-return means incorporated in the end of the tubular member communicating with the trap.

In testimony whereof I affix my signature.

HENRY BOYER.